Nov. 6, 1956  A. B. HAMMITT ET AL  2,769,212
WEATHER PLATE

Filed Nov. 9, 1953.  2 Sheets-Sheet 1

INVENTORS
ANDREW B. HAMMITT
BY HERBERT L. BIRUM, JR.

Albert Sperry.
ATTORNEY

Nov. 6, 1956  A. B. HAMMITT ET AL  2,769,212
WEATHER PLATE
Filed Nov. 9, 1953  2 Sheets-Sheet 2
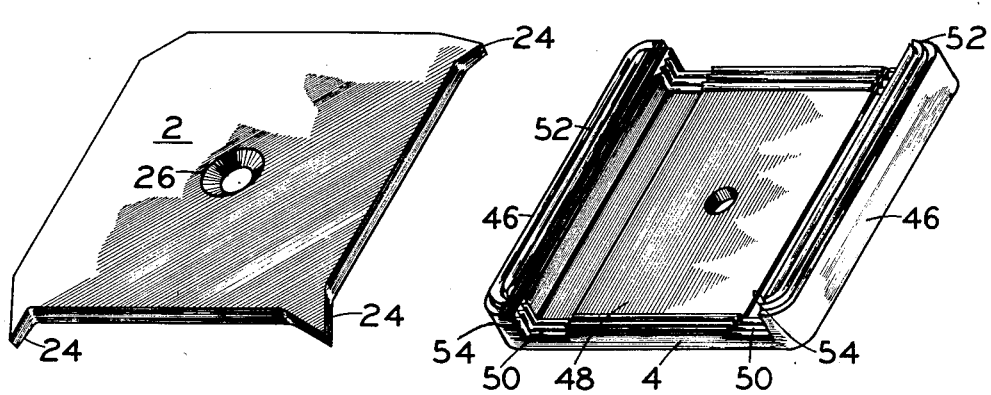
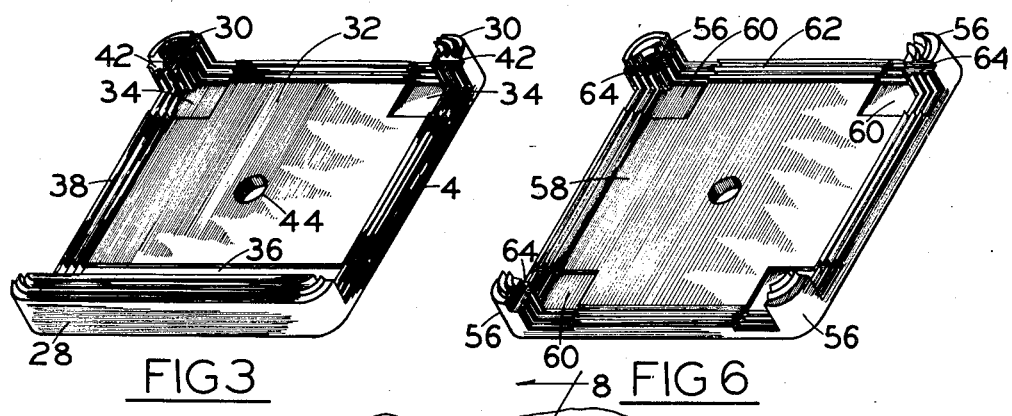
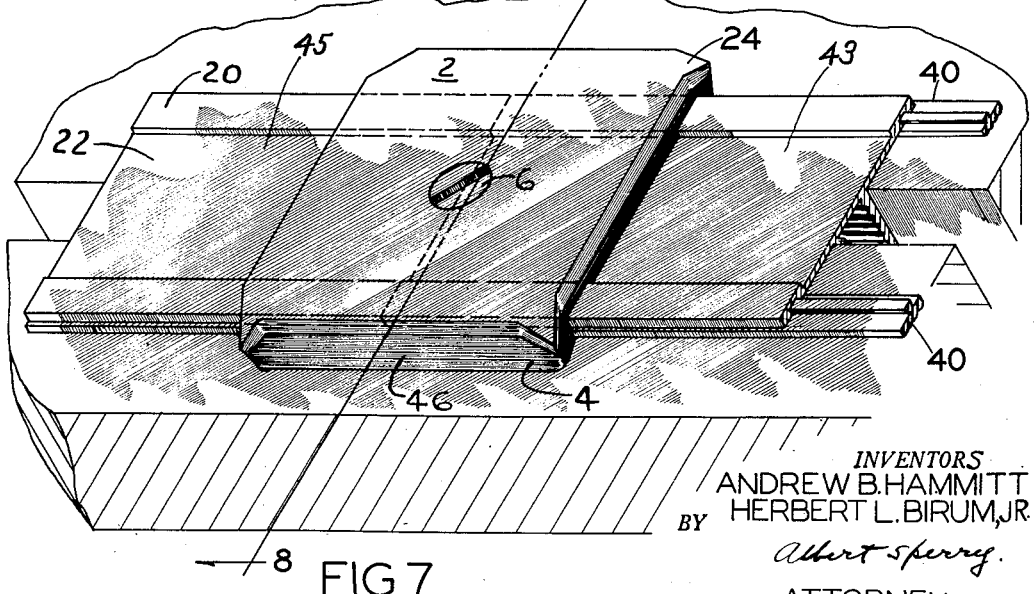
INVENTORS
ANDREW B. HAMMITT
HERBERT L. BIRUM, JR.
BY Albert Sperry
ATTORNEY United States Patent Office 2,769,212
Patented Nov. 6, 1956

2,769,212

WEATHER PLATE

Andrew B. Hammitt, Trenton, and Herbert L. Birum, Jr., Titusville, N. J.

Application November 9, 1953, Serial No. 390,918

9 Claims. (Cl. 20—4)

This invention relates to weather plates for building constructions and particularly to weather plates for providing a weather tight and water proof seal for the junctions of two or more batten strips of the type employed for concealing the joint between adjacent sheets of material in constructing buildings.

In building constructions of this type, the junctions of two or more batten strips are frequently exposed to the weather and thus become sources of leaks and seepage which may cause serious damage both to articles within the building and to the building itself. It is, therefore, desirable to provide some sort of sealing means at such junctions to restrict or eliminate such leakage.

Numerous constructions have been devised heretofore to overcome the problem of leakage, however, none of the prior constructions have been completely satisfactory since they have either provided inadequate sealing or have been difficult to apply or both. Also many of the prior devices have been too unsightly to permit their use where appearance must be considered.

These disadvantages of prior constructions are overcome with the present invention and a weather plate is provided which is simple and inexpensive to manufacture, easy to install, attractive in appearance and which assures a substantially weather tight, leakproof seal for the junctions of batten strips.

In accordance with the present invention, these advantages are preferably attained by using a cover or pressure piece, having the corner portions thereof bent inwardly, in cooperation with a preformed flexible plastic or rubber sealing sheet or element. The assembly thus provided is secured firmly in place over and about the junction to be sealed so as to hold the sealing sheet in compressed sealing relation with adjacent surfaces. Several types of sealing elements may be provided of which each is preferably in the form of a sheet designed to cooperate with the same type of cover piece whereby seals may be applied quickly and economically to a variety of junctions while utilizing a limited number of parts.

It is an object of the present invention to provide a weather plate which will cooperate with the junction of two or more batten strips to assure a weather tight, substantially leakproof joint.

It is a further object of the present invention to provide a weather plate which may be easily applied to a variety of batten strip junctions.

It is an additional object of the invention to provide a weather plate which is economical and easy to install while presenting an attractive appearance and assuring maximum protection against leakage.

A particular object of the invention is to provide a seal for the junctions of batten strips wherein a flexible sealing sheet is shaped to conform to the contours of the batten strips and is held in compressed relation over and about the junction by an overlying cover piece.

These and other objects and advantages of the present invention will be apparent in the following description wherein reference is made to the figures of the accompanying drawings.

In the drawings:

Fig. 2 is a perspective illustrating the type of cover piece used in the assembly of Fig. 1;

Fig. 3 is a perspective illustrating the sealing sheet used in the assembly of Fig. 1;

Figs. 5 and 6 are perspectives illustrating alternative forms of sealing sheets embodying the present invention;

Fig. 7 is a perspective illustrating a typical assembly embodying the sealing sheet of Fig. 5.

Figure 1:
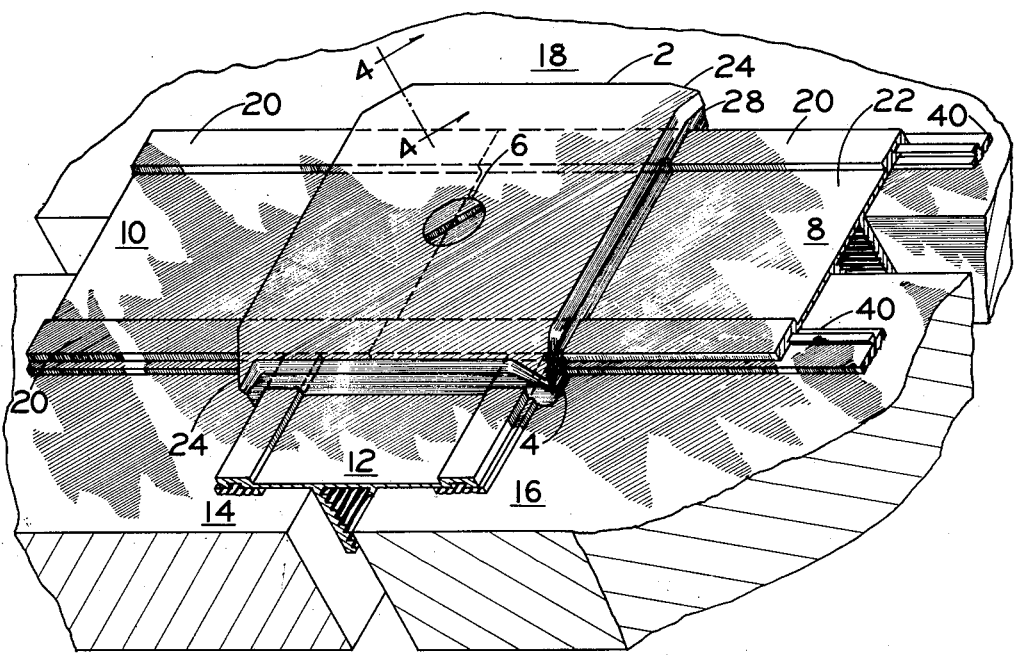
Fig. 1 is a perspective of a typical assembly embodying the present invention.

In each of the forms of the invention chosen for purposes of illustration in the drawings, the weather plate is an assembly including an outer cover or pressure piece 2, an inner sealing element or sheet 4 shaped to overlie and surround the junction between batten strips which may be variously arranged to cover and seal the joints between sheets of wall forming material. The cover piece 2 is urged toward the sealing element 4 by suitable means such as a bolt 6 to press the sealing element against the batten strips and wall forming material about the junction between the batten strips so as to provide a thoroughly weather tight and water tight seal surrounding the junction.

In the assembly shown in Figs. 1 to 4, the junction is that presented by the intersection of three batten strips indicated at 8, 10 and 12 for securing the sheets 14, 16 and 18 of wall forming material in place. In the construction shown, the outer face of each batten strip is provided with marginal ribs 20 and a central flat recessed area 22 and the inner surface of the sealing element or sheet 4 is shaped to conform to the contour of the outer face of such batten strips. However, if the batten strips are provided with any other outer contour or configuration such as a ribbed or fluted surface the inner surface of the sheet 4 may be correspondingly varied to provide a continuous sealing surface in engagement with the outer surface of the batten strips throughout the area of the junction to be sealed.

While the sealing sheets may be formed variously, depending upon the configuration of the batten strips, and the type of junction to be sealed, the cover piece 2 is the same for all applications. The workmen therefore may be provided with a single type of cover piece for use with a variety of sealing sheets. This permits the workmen to adapt the weather plate to whatever type of junction they wish to cover by choosing the proper sealing sheet, placing it over the junction, covering the sealing sheet with any one of the cover plates and securing the assembly to the junction. Furthermore, if it subsequently becomes necessary or desirable to alter the junction, that is, to increase or decrease the number of batten strips meeting at that point, the workman merely removes the cover piece, replaces the old sealing sheet with one which meets the new requirements and fastens the cover piece back in place, thereby quickly and easily converting the junction to the new form.

As seen in Figs. 1, 2, and 7, the cover piece 2 is preferably formed from a generally square flat piece of metal having the corner portions 24 thereof bent inwardly for engagement with corresponding portions of the sealing sheet 4. A countersunk hole 26 may be provided in the center of the cover piece to receive suitable securing means, such as bolt 6, whereby the cover piece may be drawn toward the sealing sheet to force the sealing sheet into sealing engagement with the batten strips and adjacent sheet material and to retain the assembly in the desired location. As seen in Figs. 1, 4, 7 and 8, the cover piece 2 presses against the sealing sheet 4 over the entire area thereof and the corner portions 24 of the cover piece 2 force the corresponding portions of the sealing sheet to "toe in" and firmly engage both the batten strips and the sheet material resulting in a weather tight and water proof seal.

Figure 8:
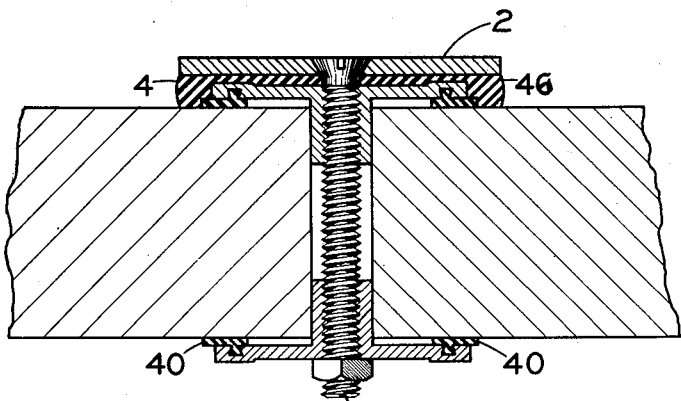
Fig. 8 is a vertical sectional view through the assembly of Fig. 7 taken on the line 8—8 thereof.
Figure 4:
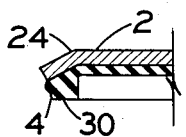
Fig. 4 is a sectional view showing a detail of the assembly taken on the line 4—4 of Fig. 1.

To seal a T-shaped junction of the type shown in Fig. 1, the sealing sheet of Fig. 3 is used in conjunction with the cover piece. The junction may be formed by the intersection of three batten strips, as shown in dotted lines in Fig. 1, or where one batten strip intersects a second strip along the length of the second strip. The sealing sheet 4 is preferably generally square and approximately the same size as the cover piece 2 and may be formed of a flexible rubber or plastic material. The back face of the sealing sheet is substantially plane while the front or batten engaging face is formed to correspond to the configuration of the batten strips and has raised marginal portions designed to contact the sides of the batten strips and to engage the sheet material adjacent the batten strips. A ridge 28 is formed along one edge of the sealing sheet of Fig. 3 and is designed to lie adjacent the sides of batten strips 8 and 10 opposite their intersection with batten strip 12, as seen in Fig. 1. The opposite corners of the sealing sheet are formed with corner posts 30 designed to lie adjacent the corners formed at the intersections of batten strips 8 and 10 with batten strip 12. The portion of the sealing sheet between the corner posts 30 and ridge 28 is formed to correspond generally to the contour of the batten strips and is shown formed with a raised generally T-shaped central portion 32, corresponding to the recessed portions 22 of the batten strips, and L-shaped recessed portions 34 surrounding corner posts 30 and straight recessed portions 36 parallel and adjacent ridge 28. These recessed portions correspond to intersecting raised portions 20 of the batten strips. To assure positive protection against leakage, ribs 38 are provided along the edges of the sealing sheet about the entire perimeter thereof. Since it is common practice in the building trade to provide sealing strips 40 which extend parallel to the batten strips under the edges thereof, as seen in Figs. 1, 7 and 8, ledges 42 are provided extending along the upper and inner edges of corner posts 30 and ridge 28 of sealing sheet 4 to permit entry of the sealing strips 40 without the possibility of gaps which might provide for leakage. Also, if desired, a hole 44 may be provided in the center of the sealing sheet 4 to facilitate passage therethrough of bolt 6 or other suitable securing means.

When a weather plate is desired to seal a junction of two abutting batten strips, as seen in Fig. 7, the sealing sheet of Fig. 5 is employed with the cover piece. For this purpose, the sealing sheet preferably has its batten strip engaging face formed with two ridges 46 similar to the ridges 28 of Fig. 3 extending parallel to each other along opposite edges of the sealing sheet. These ridges will lie adjacent opposite sides of the batten strips 43 and 45 in contact with the sheet material, as seen in Fig. 8. The portion of the face of the sealing sheet between the ridges 46 corresponds generally to the contour of the batten strips and is shown in Fig. 5 as having a raised central portion 48 to engage recessed portions 22 of the batten strips 43 and 45 and straight recessed portions 50 extending parallel to the ridges 46 between the ridges and the central portion 48 to receive raised portions 20 of the batten strips. Ribs 52 extend parallel to the edges of the sealing sheet about the entire perimeter thereof and ledges 54, similar to ledges 42 of Fig. 3, are formed along the upper and inner edges of the ridges 46 to accommodate the sealing strips 40 on the battens.

When it is desired to seal a junction where the ends of four batten strips join or where two batten strips intersect a third batten strip along the length of the third batten strip, the sealing sheet, of Fig. 6, is employed. In this form of the sealing sheet, the batten strip engaging face is formed with a corner post 56, similar to corner posts 30 of Fig. 3, located at each of the corners of the sealing sheet. The remainder of the face is formed to fit the contour of the batten strips and is shown as having a raised, generally cross-shaped central portion 58 and L-shaped corner recesses 60 surrounding each of the corner posts 56. Ribs 62 extend parallel the edges of the sealing sheet about the entire perimeter thereof. Ledges 64, similar to ledges 42 of Fig. 3, extend along the upper and inner edges of the corner posts 56 to accommodate sealing strips.

This form of the sealing sheet is applied with each of the corner posts lying in contact with the corners formed by the intersection of adjacent batten strips in the same manner as the corner posts 30 of the sealing sheet of Fig. 3 as used in the assembly of Fig. 1. The cover piece is then placed in position covering the sealing sheet with the inwardly bent corner portions thereof bearing against the back of the sealing sheet adjacent the corners of the sheet and the assembly is drawn rigidly into place by the securing means causing the corner portions of the cover piece to force the corner posts of the sealing sheet to "toe in" and firmly engage the corners formed by the intersection providing a weather tight and water tight seal for the junction.

Numerous changes and modifications may be made, for example, the shape of the cover piece may be changed and other sealing sheets may be provided, also, the adjoining batten strips may have their ends spaced slightly. Therefore, it should be clearly understood that those forms of the invention described above and shown in the figures of the accompanying drawings are intended to be illustrative only and are not intended to limit the scope of the invention.

What we claim is:

1. A weather plate for use in building constructions wherein a plurality of batten strips abut, said weather plate comprising a generally rectangular cover piece having cover portions thereof bent diagonally inwardly and a flexible sealing sheet having a preformed batten strip engaging face shaped to conform to the outer contour of the batten strips to be sealed, said sheet having thickened edge portions engageable by said inwardly bent portions of said cover plate, said edge portions of said sheet will be urged laterally into sealing engagement with the sides of said batten strip when said cover piece is secured in place.

2. A weather plate for providing a weather tight seal about a junction of a plurality of batten strips comprising a generally rectangular cover piece having the corner portions thereof bent diagonally inwardly and a generally rectangular flexible sealing sheet having a batten strip engaging face preformed with raised portions adjacent the center and edges of said face, said center portion being of less thickness than said edge portions, recessed portions intermediate said raised center and edge portions, and a plurality of ribs extending about the perimeter of said face adjacent the edges thereof.

3. A weather plate for covering a junction of two batten strips comprising a rigid generally rectangular cover piece having the corner portions thereof bent diagonally inwardly and a generally rectangular flexible sealing sheet having a preformed batten strip engaging face preformed with raised ridge portions extending along two opposite edges of said face throughout the entire length thereof, said ridge portions having ledges extending the length of said ridge portions adjacent the upper and inner edges thereof, a central raised portion of less thickness than said ridge portions extending across said face parallel said ridge portions and located between said ridge portions and said central portion, and ribs extending about the perimeter of said face adjacent the edges thereof.

4. A weather plate for use in building constructions wherein three batten strips abut comprising a generally square cover piece having the corner portions thereof bent diagonally inwardly and a generally square flexible sealing sheet preformed with a batten strip engaging face having a raised ridge portion extending along the entire length of one edge of said face, corner posts projecting upward perpendicularly from the corners of said face opposite said ridge portion, recessed L-shaped portions surrounding said corner posts, and ribs extending about the perimeter of said face adjacent the edges thereof.

5. A weather plate for use in building constructions wherein a plurality of batten strips abut comprising a generally square cover piece having the corner portions thereof bent diagonally inwardly and a generally square flexible sealing sheet having a batten strip engaging face preformed with corner posts rising perpendicularly from each of the corners of said face, recessed L-shaped portions surrounding each of said corner posts, a raised, generally cross-shaped central portion extending between said recessed portions and ribs extending about the perimeter of said face adjacent the edges thereof.

6. A building construction comprising sheet material, a plurality of intersecting batten strips concealing the joints between the edge of said sheet material, a weather plate covering the junction formed by said intersecting batten strips, said weather plate comprising a cover piece extending over the junction of said batten strips and having the marginal portions of said cover piece projecting diagonally inwardly adjacent the intersecting sides of the batten strips, and a flexible sealing sheet located between said junction and said cover piece and having a preformed face conforming to the contour of the outer surfaces of said batten strips and having edge portions lying adjacent the sides of said batten strips in sealing engagement with the sheet material supported by said batten strips, said corner portions of said cover piece forcing said edge portions of said sealing sheet laterally into firm engagement with said batten strips and said sheet material, and fastener means rigidly securing said cover piece and said sealing sheet to said junction.

7. A building construction comprising sheet material, a pair of batten strips concealing the joints between adjacent sheets of said sheet material, a junction whereat said batten strips meet each other in end to end relation, a weather plate covering said junction, said weather plate comprising a preformed generally square flexible sealing sheet having a batten strip engaging face shaped to correspond to the contour of the outer surface of said batten strips, ridge portions extending along opposite edges of said face and lying adjacent the edges of said batten strips in sealing engagement with said batten strips and with said sheet material, a generally square cover piece overlying said sealing sheet and having the corner portions thereof bent diagonally inwardly thereby forcing corresponding portions of said sealing sheet laterally into firm engagement with said batten strips and said sheet material, and fastener means rigidly securing said weather plate to said junction.

8. A building construction comprising sheet material, a plurality of intersecting batten strips concealing the joints between adjacent sheets of said sheet material, a T-shaped junction whereat said batten strips intersect, a weather plate covering said junction, said weather plate comprising a preformed, generally square flexible sealing sheet having a batten strip engaging face contoured to correspond to the shape of the outer surface of said batten strips, a ridge portion extending along one edge of said face and lying opposite one of said intersecting batten strips and adjacent the head of said T-shaped junction in contiguity therewith and with said sheet material supported by said batten strips, corner posts projecting perpendicularly from the corners of said face opposite said ridge portion, one of said corner posts lying adjacent each of the corners established by the intersection of the batten strip forming the base of said T-shaped junction in contiguity with said intersection and said sheet material adjacent said batten strips, a generally square cover piece overlying said sealing sheet and having the corner portions thereof bent diagonally inwardly forcing corresponding portions of said sealing sheet laterally into firm engagement with said batten strips and said sheet material, and fastener means rigidly securing said weather plate to said junction.

9. A building construction comprising sheet material, a plurality of intersecting batten strips concealing the joints between adjacent sheets of said sheet material, a generally cross-shaped junction whereat said batten strips intersect in mutually perpendicular, coplanar relation, a weather plate covering said junction, said weather plate comprising a preformed, generally square, flexible sealing sheet having a batten strip engaging face contoured to correspond to the shape of said batten strips, corner posts projecting perpendicularly from each of the corners of said face and each of said corner posts lying adjacent one of the corners formed by the intersection of adjacent batten strips in contiguity with said intersection and said sheet material, a generally square cover piece overlying said sealing sheet and having the corner portions thereof bent diagonally inwardly forcing said corner posts laterally into firm engagement with said batten strips and said sheet material, and fastener means rigidly securing said weather plate to said junction.

References Cited in the file of this patent

UNITED STATES PATENTS

| 555,097 | Hurd | Feb. 25, 1896 |
| 1,966,673 | Linck | July 17, 1934 |
| 2,028,615 | Lenke | Jan. 21, 1936 |
| 2,249,106 | Baumgartl | July 15, 1941 |
| 2,540,603 | Urbain | Feb. 6, 1951 |

OTHER REFERENCES

Circular entitled Top-Side Fasteners for Cemesto Board, The Celotex Corp., Chicago, Ill., June 19, 1952.